(12) United States Patent
Springer et al.

(10) Patent No.: US 11,627,798 B2
(45) Date of Patent: Apr. 18, 2023

(54) WORK SURFACE AND MOUNTING ASSEMBLY

(71) Applicant: NOMADLABS LLC, Logan, UT (US)

(72) Inventors: Bradley David Springer, Wellsville, UT (US); Somnanritha Sothoeun Chan, Matthews, NC (US)

(73) Assignee: NOMADLABS LLC, Logan, UT (US)

( * ) Notice: Subject to any disclaimer, the term of this patent is extended or adjusted under 35 U.S.C. 154(b) by 0 days.

(21) Appl. No.: 17/560,778

(22) Filed: Dec. 23, 2021

(65) Prior Publication Data
US 2022/0369802 A1 Nov. 24, 2022

Related U.S. Application Data

(60) Provisional application No. 63/189,681, filed on May 18, 2021.

(51) Int. Cl.
A47B 5/04 (2006.01)
A47B 21/06 (2006.01)

(52) U.S. Cl.
CPC .............. *A47B 5/04* (2013.01); *A47B 21/06* (2013.01); *A47B 2200/0036* (2013.01); *A47B 2200/0066* (2013.01); *A47B 2200/01* (2013.01)

(58) Field of Classification Search
CPC ... A47B 5/04; A47B 21/06; A47B 2200/0066; A47B 2200/01
USPC .............. 108/134, 42, 47, 48, 153.1, 157.1, 108/157.12, 157.13
See application file for complete search history.

(56) References Cited

U.S. PATENT DOCUMENTS

| | | | | |
|---|---|---|---|---|
| 155,432 A * | 9/1874 | Donnell | ................... | A47B 5/04 248/240.3 |
| 374,980 A * | 12/1887 | Legg | ...................... | A47B 5/06 211/195 |
| 665,728 A * | 1/1901 | Burch | ...................... | A47B 5/04 108/135 |
| 960,213 A * | 5/1910 | Williams | ................. | A47B 5/06 108/48 |
| 1,007,489 A * | 10/1911 | Reichel | .................... | A47B 5/04 248/240.3 |
| 1,331,635 A * | 2/1920 | Flaherty | .................. | D06F 81/06 108/48 |
| 1,567,357 A * | 12/1925 | Cummings | ............. | A47C 9/06 297/14 |
| 1,838,846 A * | 12/1931 | Laursen | ................... | A47B 5/04 108/38 |
| 2,199,981 A * | 5/1940 | Bell | ......................... | A47B 5/04 108/166 |
| 2,226,735 A * | 12/1940 | Miller | .................... | A47B 31/06 108/48 |
| 2,477,771 A * | 8/1949 | Sanford | .............. | A47B 96/062 248/250 |
| 3,696,762 A * | 10/1972 | Holdham | ................ | A47B 5/04 108/2 |
| 4,047,488 A * | 9/1977 | Gutridge | ............... | B61D 37/00 105/315 |

(Continued)

*Primary Examiner* — Janet M Wilkens
*Assistant Examiner* — Timothy M Ayres
(74) *Attorney, Agent, or Firm* — The Small Patent Law Group LLC; Will Breeze

(57) ABSTRACT

The present invention relates to a work surface and mounting assembly. More specifically, a work surface that is selectively coupleable to a mounting assembly.

16 Claims, 16 Drawing Sheets

(56) References Cited

U.S. PATENT DOCUMENTS

| | | | | |
|---|---|---|---|---|
| 4,068,601 | A * | 1/1978 | Marsh | A47B 5/04 403/100 |
| 4,733,843 | A * | 3/1988 | Bessinger | A47B 96/065 211/90.01 |
| 4,736,919 | A * | 4/1988 | Bessinger | A47B 96/065 211/90.01 |
| 4,783,916 | A * | 11/1988 | Whitehead | A47G 25/72 38/104 |
| 4,834,332 | A * | 5/1989 | Vanderbilt | D06F 81/06 108/48 |
| 5,020,758 | A * | 6/1991 | Rawlyk | A47B 96/063 211/90.01 |
| 5,092,253 | A | 3/1992 | Grund et al. | |
| 5,358,067 | A * | 10/1994 | Ford | E06C 1/005 182/35 |
| 5,551,100 | A * | 9/1996 | Kindrick | A47K 3/122 4/578.1 |
| 5,799,803 | A * | 9/1998 | Muller | A47B 96/02 211/90.01 |
| 6,065,251 | A * | 5/2000 | Kindrick | A47K 3/122 297/14 |
| 6,343,834 | B1 * | 2/2002 | Wurmlinger | A47C 9/06 297/14 |
| 6,705,235 | B1 * | 3/2004 | Gerutto | A47B 5/00 108/47 |
| 7,735,428 | B2 * | 6/2010 | Petty | A47B 5/006 108/38 |
| 8,434,415 | B1 * | 5/2013 | Federici | A47C 7/62 108/42 |
| 9,179,769 | B1 * | 11/2015 | Port | A47C 7/705 |
| 10,051,956 | B2 | 8/2018 | Burgess et al. | |
| 10,709,235 | B1 * | 7/2020 | Brown | A47B 5/04 |
| 11,319,978 | B2 * | 5/2022 | Klingler | F16B 12/10 |
| 2004/0134388 | A1 * | 7/2004 | Schultz | A47B 5/02 108/42 |
| 2009/0026342 | A1 | 1/2009 | Bochner et al. | |
| 2018/0360206 | A1 * | 12/2018 | Trujillo | F16B 5/0088 |

* cited by examiner

WORK SURFACE AND MOUNTING ASSEMBLY

CROSS-REFERENCE TO RELATED APPLICATIONS

This application claims priority to U.S. Provisional Application No. 63/189,681 filed May 18, 2021. The aforementioned U.S. Provisional Application is incorporated by reference herein in its entirety for all purposes.

BACKGROUND

The present invention relates to a work surface and mounting assembly.

SUMMARY

In one embodiment, the present invention relates to a movable work surface and mounting assembly comprising a mounting portion and a work surface selectively coupled to the mounting portion. The work surface includes a top surface, a bottom surface, a forward edge, a rearward edge, and two lateral edges extending between the forward edge and the rearward edge. The mounting portion includes a top side, a bottom side, a back side, and a front side. The back side is mounted to a wall. The front side includes a door selectively movable between a first position and a second position. In the first position the door is substantially planar between the top side and the bottom side. In the second position the door extends away from the top side, exposing an arm and an aperture. The work surface is movable between a removed position and a coupled position. In the removed position the mounting portion is in the first position and the work surface is spaced apart from the mounting portion. In the coupled position the mounting portion is in the second position and the work surface is coupled to the mounting portion. In the coupled position a portion of the work surface is inserted into the aperture such that a mounting portion of the top surface and a mounting portion of the bottom surface are within the aperture and a support portion of the bottom surface is engaged by the arm outside of the aperture.

In one embodiment, the present invention relates to a movable work surface and mounting assembly comprising a mounting portion and a work surface selectively coupled to the mounting portion. The mounting portion includes a front side, a back side, a top side, a bottom side, and two lateral sides. The mounting portion further includes an arm and an aperture that is selectively coverable by an aperture cover. The back side of the mounting portion is mounted to a wall and the aperture cover is movable between a first position in which the aperture cover is positioned to cover the aperture and a second position in which the aperture cover is moved to expose the aperture and a door on the front side moves to expose the arm. The work surface has a front edge, a back edge, two lateral edges, a top surface, and a bottom surface. The work surface includes a mounting area covering a portion of the top surface and the bottom surface, and a support area on the bottom surface. The work surface is moveable between a removed position in which the work surface is spaced apart from the mounting portion and a coupled position in which the work surface is coupled to the mounting portion. In the coupled position the mounting portion is in the second position such that the am and aperture are exposed. The aperture is positioned to receive the mounting area of the work surface and the arm is positioned to engage the support area of the work surface.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

The present disclosure relates to a work surface that is removably coupleable to a mounting assembly. The mounting assembly is mounted to a surface, such as a wall. As used in the application a wall means any sufficiently planar surface to which the mounting assembly could be mounted or affixed, such as a wall, a cabinet, a door, a vehicle, or the like. The work surface is movable between a mounted position in which the work surface is mounted or coupled to the mounting assembly and a removed position in which the work surface is removed and spaced apart from the mounting assembly. The removability of work surface allows a user to move the work surface from location to location where a mounting assembly is available. This provides the user flexibility to change what area, space, or room the user works in, but also to adjust the height of the work surface based on preference (e.g., standing desk or sitting desk), as well as based on the height of the user and desired work surface height. Additionally, the current embodiments allow the user to optimize space, especially where limited space is available, by coupling the work surface to create a workspace when needed and removing the work surface when a workspace is not needed. When the work surface is removed, the mounting assembly is low profile and non-obstructive to the surrounding room.

Figure 1:
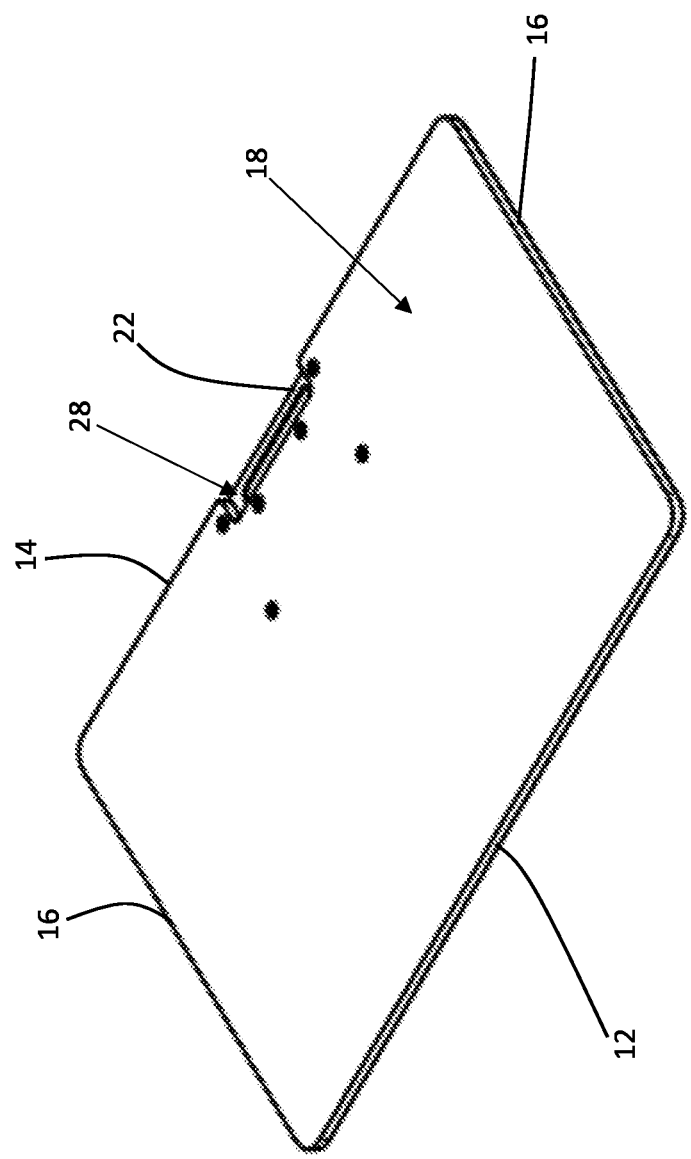
FIG. 1 is a perspective view of a work surface in a removed position, according to one embodiment.
Figure 2:
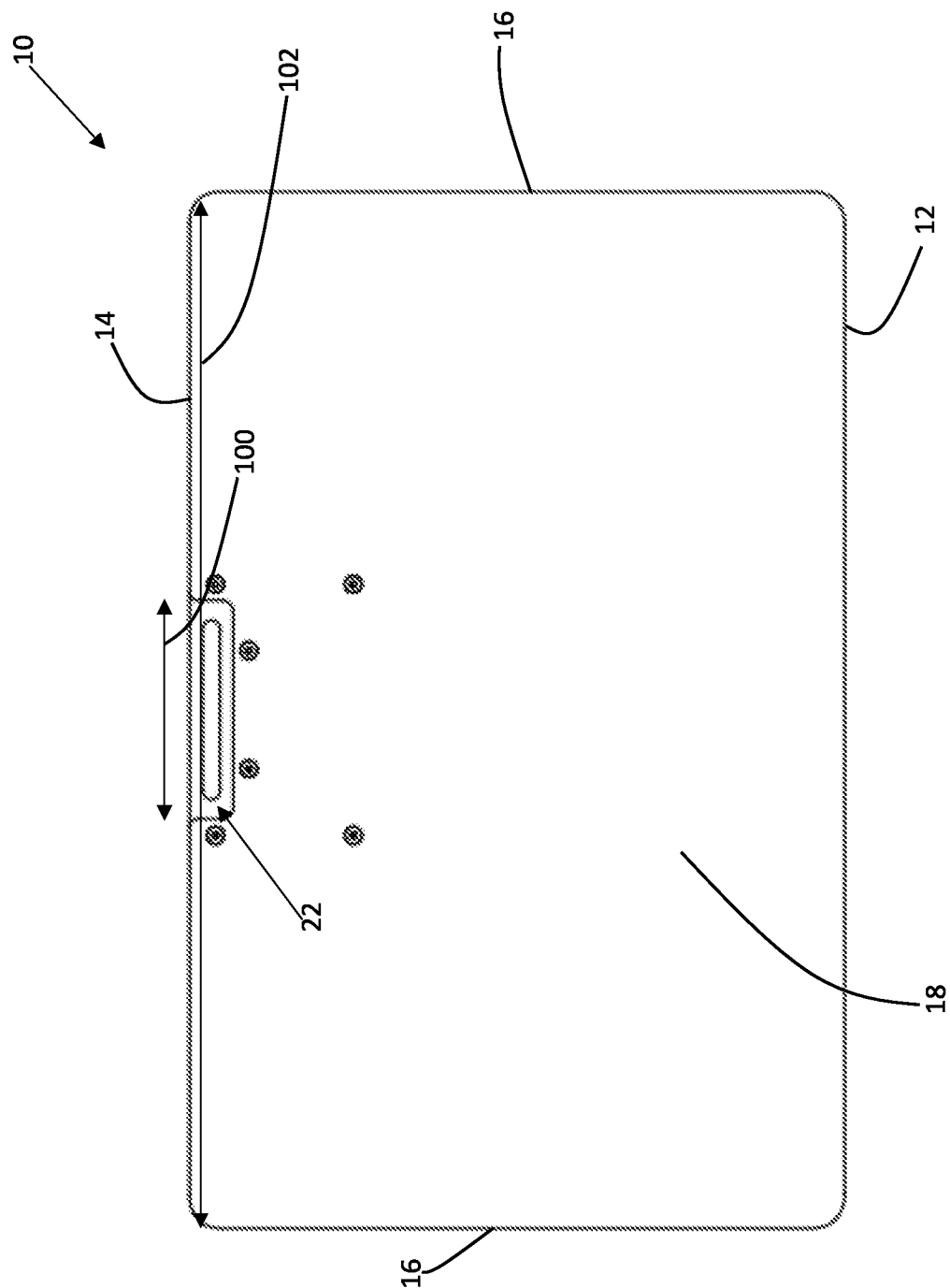
FIG. 2 is a top view of the work surface of FIG. 1, shown in a removed position.
Figure 3:
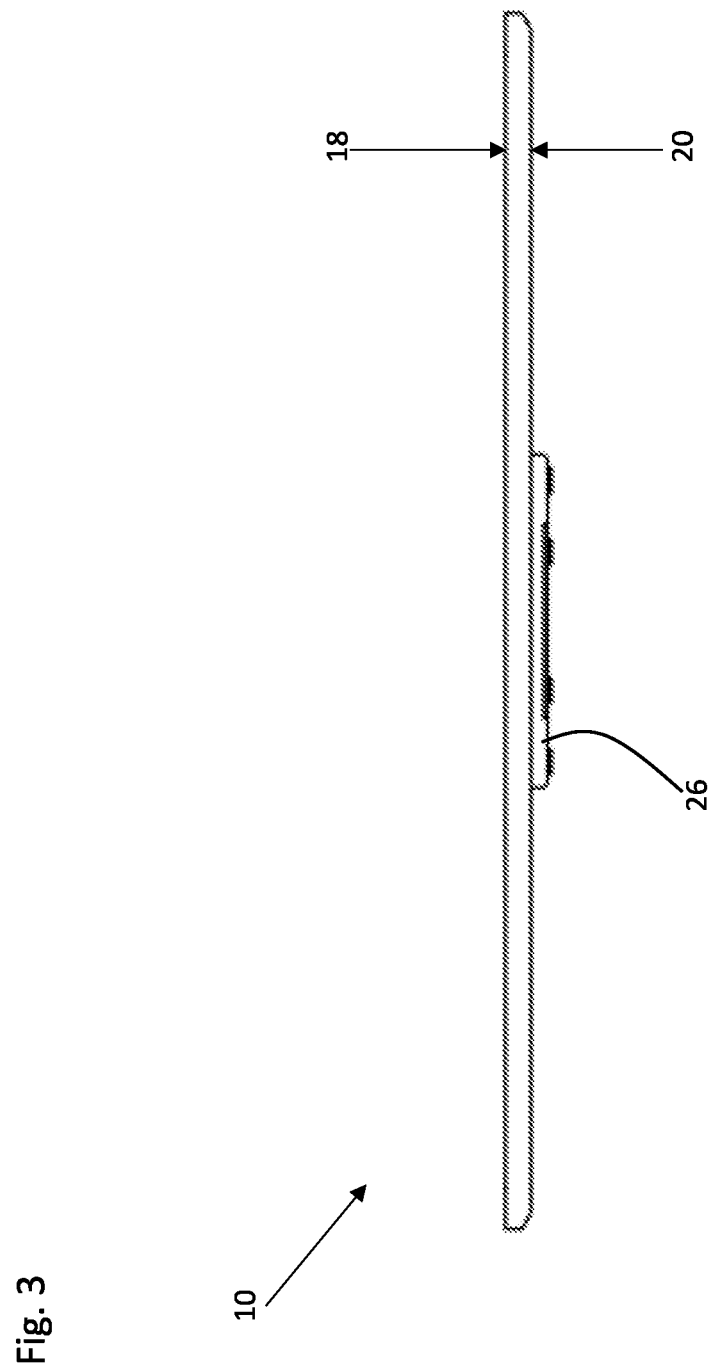
FIG. 3 is a front view of the work surface of FIG. 1, shown in a removed position.

In the embodiment illustrated in FIGS. 1-3, the work surface 10 has a top surface 18, a bottom surface 20, a forward edge 12, a rearward edge 14, and two lateral edges 16 extending between the forward edge 12 and the rearward edge 14. The top surface 18 and bottom surface 20 are bounded by the edges 12, 14, 16. In the illustrated embodiment, the work surface 10 includes a mounting area 22 extending over a portion of the top surface 18 and the bottom surface 20. The work surface 10 also includes a support area 26 on the bottom surface 20.

Figure 5:
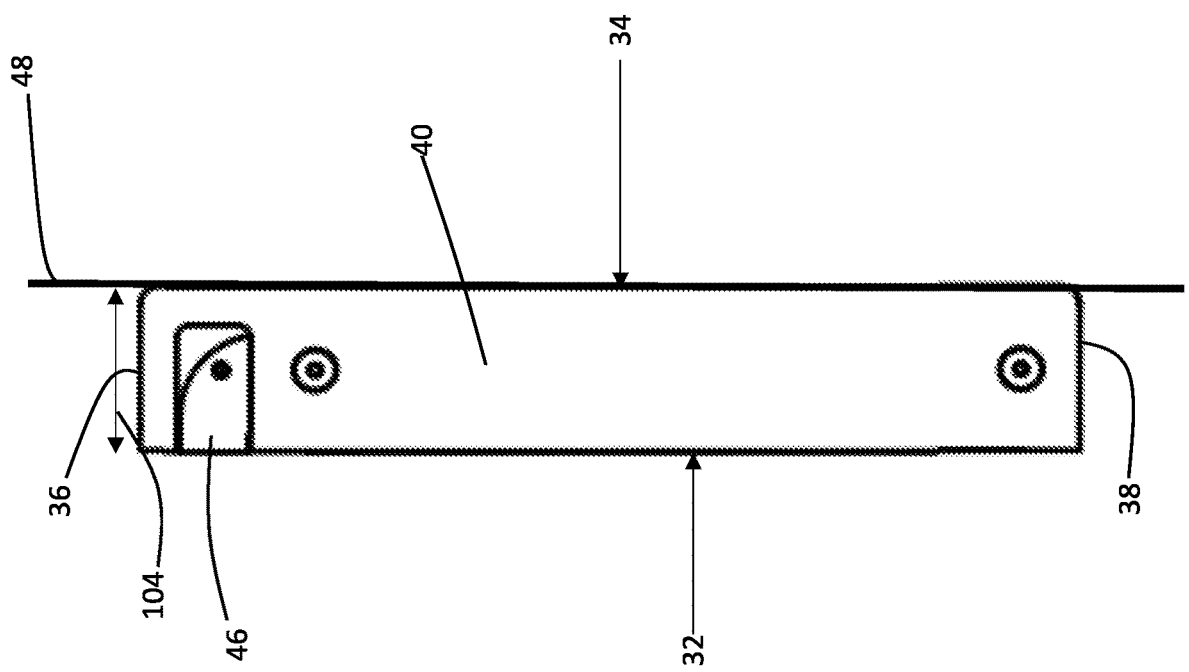
FIG. 5 is a side view of the mounting portion shown in FIG. 4.
Figure 6:
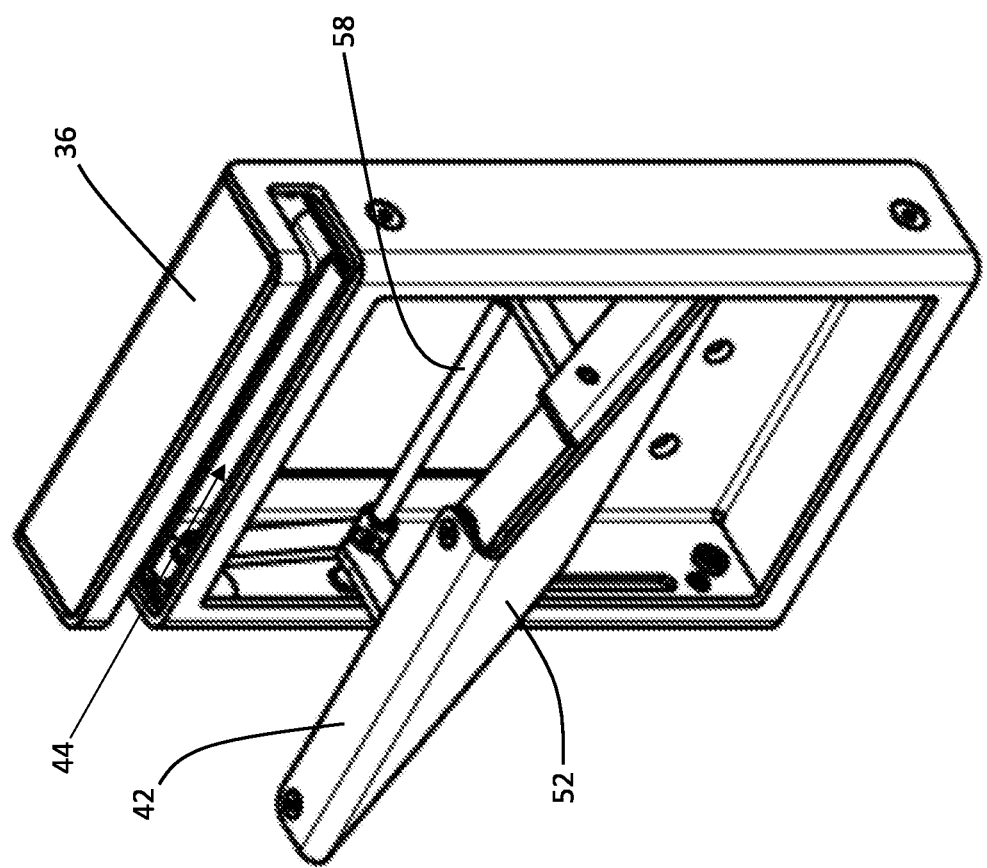
FIG. 6 is a perspective view of the mounting portion shown in FIG. 4, shown in an open position.
Figure 7:
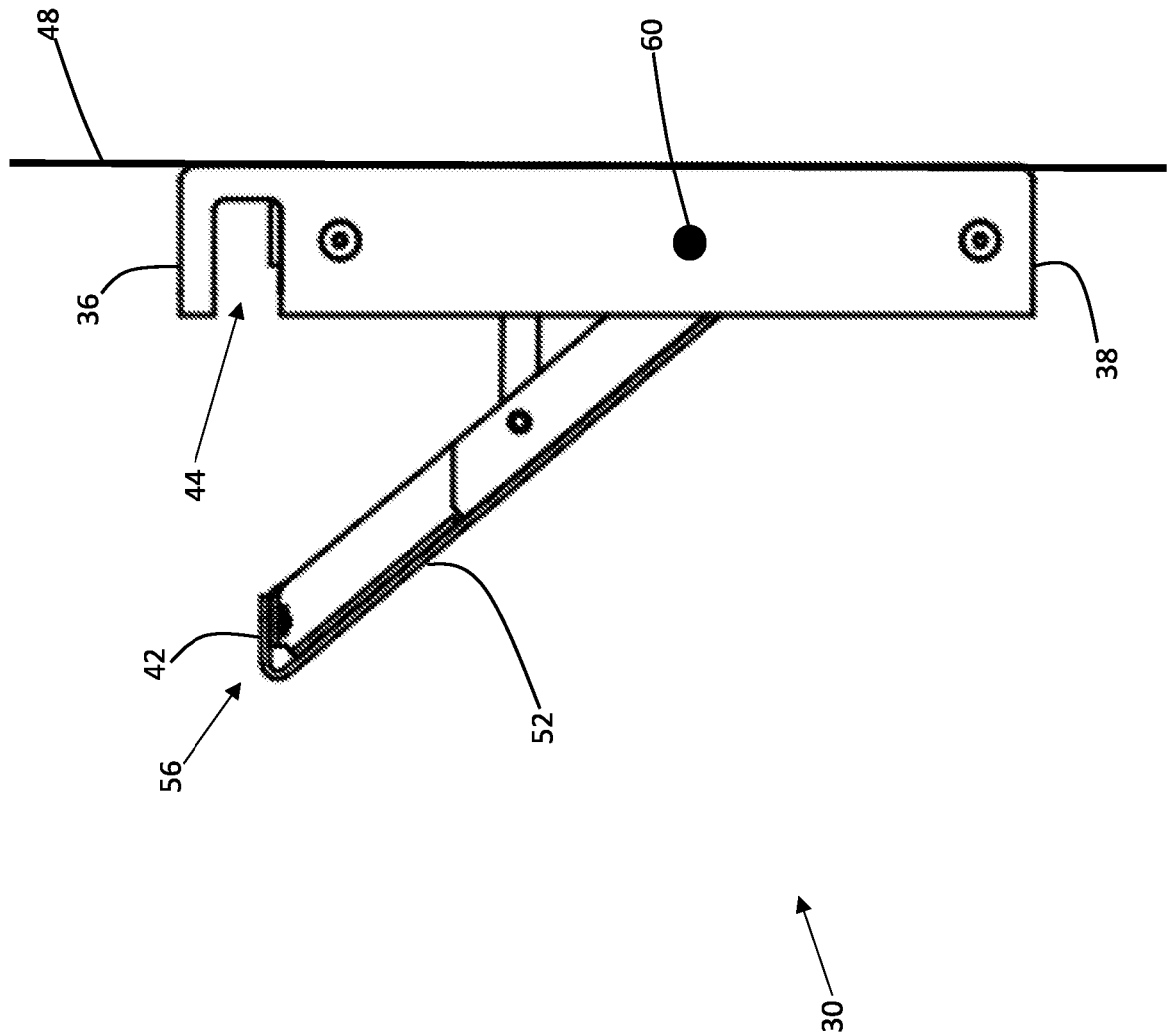
FIG. 7 is a side view of the mounting portion shown in FIG. 6, shown in an open position.
Figure 8:
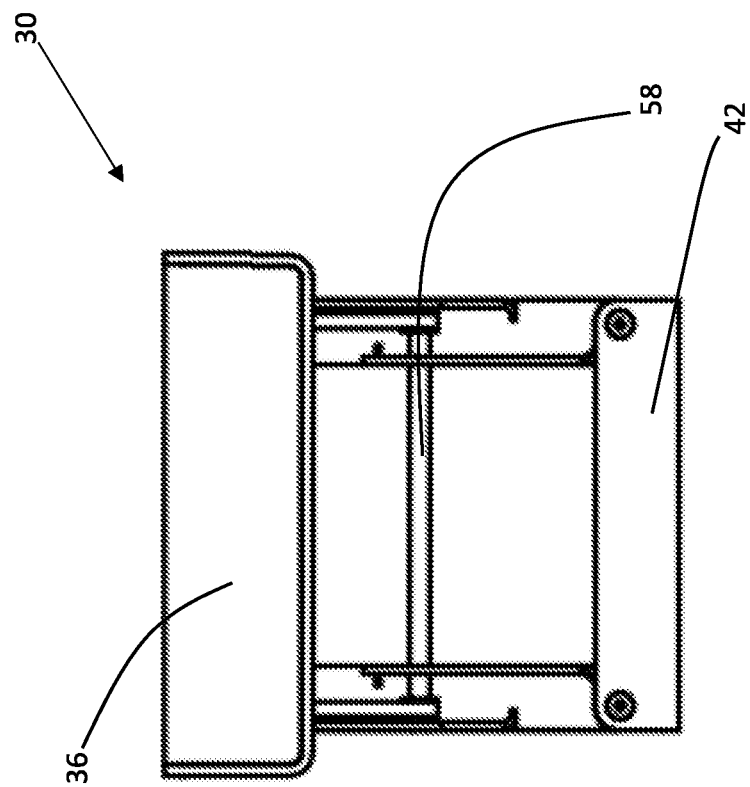
FIG. 8 is a top view of the mounting portion shown in FIG. 6, shown in an open position.

In the embodiment illustrated in FIGS. 5-8, the mounting portion 30 has a front side 32, a back side 34, a top side 36, a bottom side 38, and two lateral sides 40. As shown in FIGS. 5 and 7, the back side 34 of the mounting portion 30 mounted to a wall 48. As discussed above, the wall can be any planar surface such as a wall, column, cabinet, door, vehicle, or the like. The mounting portion 30 further includes a door 52 on the front side 32, an arm 42, and an aperture 44. The aperture 44 is selectively coverable by an aperture cover 46. The door 52 is positioned below the aperture cover 46.

Figure 4:
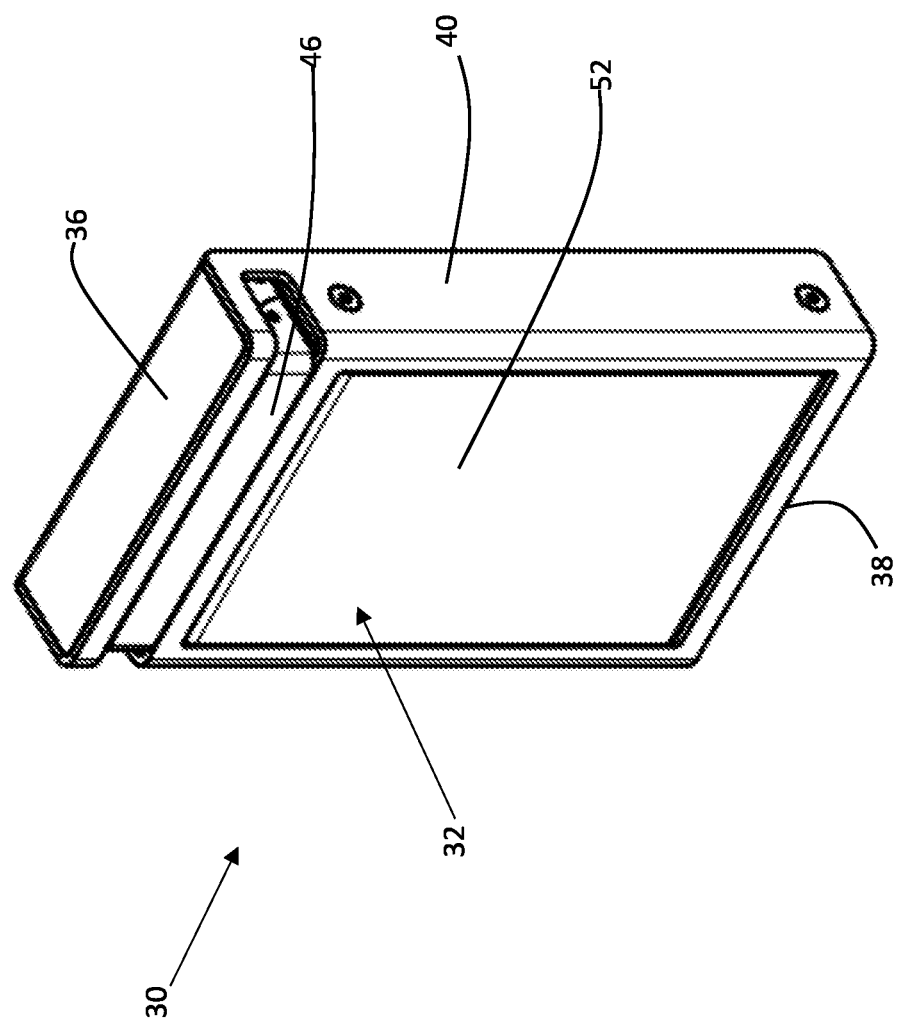
FIG. 4 is a perspective view of a mounting portion, shown in a closed position.

In a first position, shown in FIGS. 4 and 5, the aperture cover 46 is positioned to cover the aperture 44 and the door 52 is in a substantially closed orientation. In the illustrated embodiment, the door 52 is substantially in line between the top side 36 and the bottom side 38 in the first position. In a second position, shown in FIGS. 6-8, the aperture cover 46 is moved to expose the aperture 44. Further, in the second position, the door 52 on the front side 32 moves to expose the arm 42. The arm 42 is connected to an upper side 56 of the door 52. When the mounting portion moves from the second position to the first position, the arm 42 moves to a hidden position within the mounting portion 30, as shown in FIGS. 4 and 5. In the illustrated embodiment, the door 52, the arm 42, and the aperture cover 46 are movable together.

Figure 10:
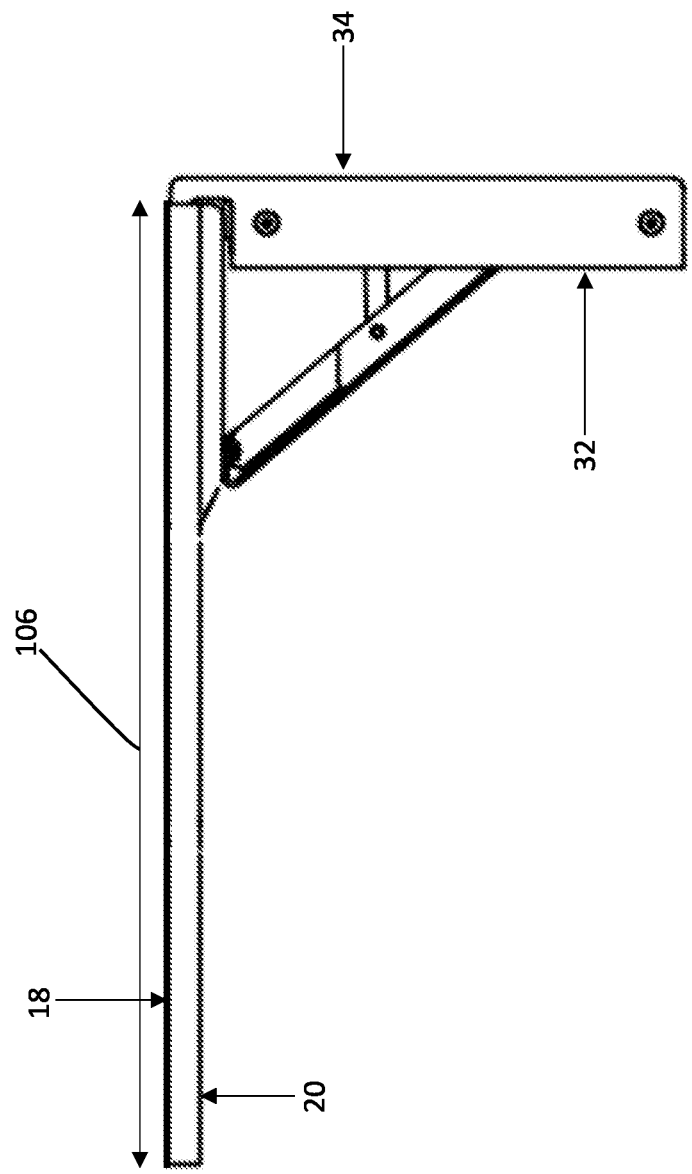
FIG. 10 is a side view of the work surface and the mounting portion of FIG. 9, shown in a coupled position.
Figure 11:
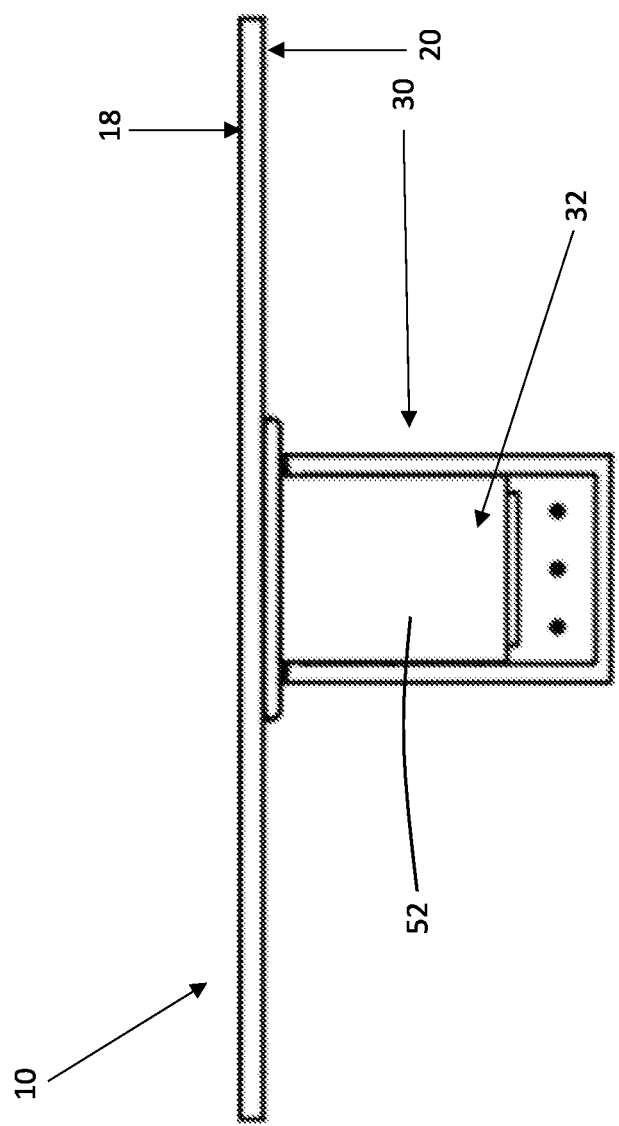
FIG. 11 is a front view of the work surface and the mounting portion of FIG. 9, shown in a coupled position.

In the second position, the aperture 44 is sized and positioned to receive the work surface 10. The mounting area 22 enters the aperture 44. The mounting area 22 entering the aperture 44 allows the work surface 10 to be supported on the top surface 18 and the bottom surface 20 by the aperture 44, as illustrated in FIG. 10. Additionally, the arm 42 is positioned to engage the support area 26, further supporting and retaining the work surface 10. These interactions work together to support the weight of the work surface 10 and the materials the user may put on the work surface, such as a computer, monitor, keyboard, papers, and the like. In the embodiments illustrated in FIGS. 6-8, the mounting portion 30 further includes one or more cross linkage bars 58. The cross linkage bars 58 are coupled to the door 52 and help support the main load of the work surface 10. The cross linkage bars 58 are hidden in the first position and are partially exposed in the second position.

When the work surface 10 is removed from the mounting portion 30, the door 52, the arm 42, and the aperture cover 46 all return to the first position to a stowed, compact, and generally planar orientation. The user does not need to move any of these components back into place individually, the user only needs to remove the work surface 10 and the components will return to the first position. The retraction of the arm 42 in the first position helps maintain a compact, low-profile design for the mounting portion 30.

In the illustrated embodiment, the door 52 translates and then pivots between the first position and the second position. In the first position the door 52 is substantially planar with the top side 36 and the bottom side 38. In the second position the door 52 translates upward, then pivots about a pivot point 60 to move away from the top side 36. In other embodiments the door 52 may rotate, only translate, only pivot, or some combination.

Figure 9:
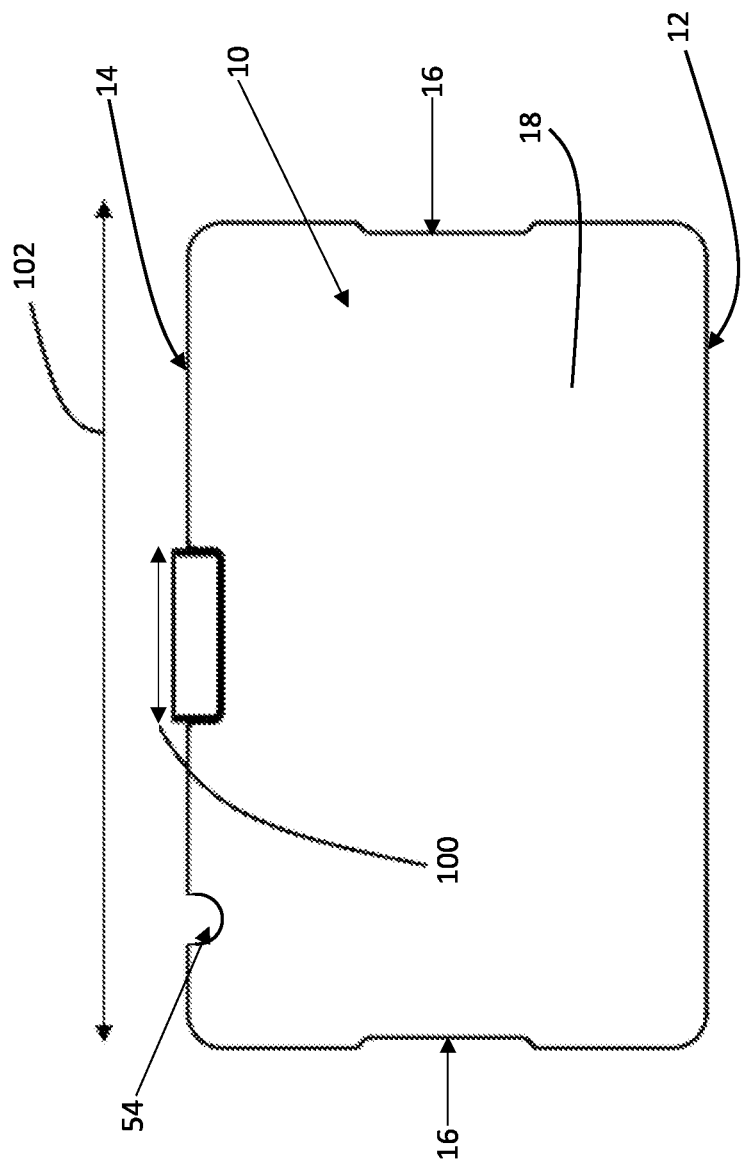
FIG. 9 is a top view of a work surface and a mounting portion, shown in a coupled position.

In the embodiment illustrated in FIGS. 2 and 9, the mounting area 22 has a mounting length 100 along the rearward edge 14 of the work surface 10. The work surface 10 has a rearward edge length 102 along the rearward edge 14. The mounting length 100 extends a length less than the rearward edge length 102. In one embodiment, the mounting length 100 is 75% or less of the rearward edge length 102. In another embodiment, the mounting length 100 is between 25% and 75% of the rearward edge length 102. In another embodiment, the mounting length 100 is between 10% and 25% of the rearward edge length 102. In another embodiment, the mounting length 100 is between 5% and 10% of the rearward edge length 102. By having a mounting length 100 less than the rearward edge length 102, it allows for the mounting portion 30 to be smaller and more compact, while still supporting the work surface 10 when coupled. Thus, when the work surface 10 is removed and the mounting portion 30 remains on the wall 48, the mounting portion 30 takes up less space and is less intrusive of the surrounding room and aesthetic. In the present invention, the mounting area 22 interacts with the work surface along one continuous length in the coupled position.

In the embodiment illustrated in FIG. 5, the lateral sides 16 of the mounting portion 30 have a mounting depth 104 measured from the front side 32 to the back side 34, where the back side 34 is adjacent the wall 48. The lateral edges 16 of the work surface have a surface depth 106 measured from the forward edge 12 to the rearward edge 14, as illustrated in FIG. 10. In one embodiment, the mounting depth 104 is 50% of the surface depth 106. In another embodiment, the mounting depth 104 is between 15% and 50% of the surface depth 106. In another embodiment, the mounting depth 104 is between 2% and 15% of the surface depth 106. One of the benefits of the present invention is a compact and low-profile mounting arrangement that is able to support the weight of a desk or work surface. By having the mounting depth 104 significantly smaller than the surface depth 106, the mounting portion 30 is able to be compact and low profile when the working surface is removed.

In the embodiment illustrated in FIG. 1, the mounting area 22 includes a depression 28 that extends below the top surface 18. The depression 28 is positioned such that when the work surface 10 is coupled to the mounting portion 30, the depression 28 aligns with the aperture 44. When coupled, the top side 36 of the mounting portion 30 is substantially level with the top surface 18 of the work surface 10, as shown in FIG. 10. The depression 28 allows for a substantially flat work surface 10 which allows the user to utilize the entirety of the surface. Further, the flat surface allows for a more seamless and unified aesthetic. Additionally, in one embodiment, the top side 36 of the mounting portion 30 has an identical material and/or pattern to that of the top surface 18 of the work surface 10, further adding to the unified aesthetic and making the mounting portion 30 and work surface 10 appear to be a single construction in the coupled position.

In one embodiment, shown in FIG. 9, the rearward edge 14 of the work surface 10 includes a cut-out portion 54 between the two lateral edges 16. The cut-out portion 54 is positioned such that when the work surface 10 is mounted to the mounting portion 30, the user may run a cord from the work surface through the cut-out portion 54.

Figure 12:
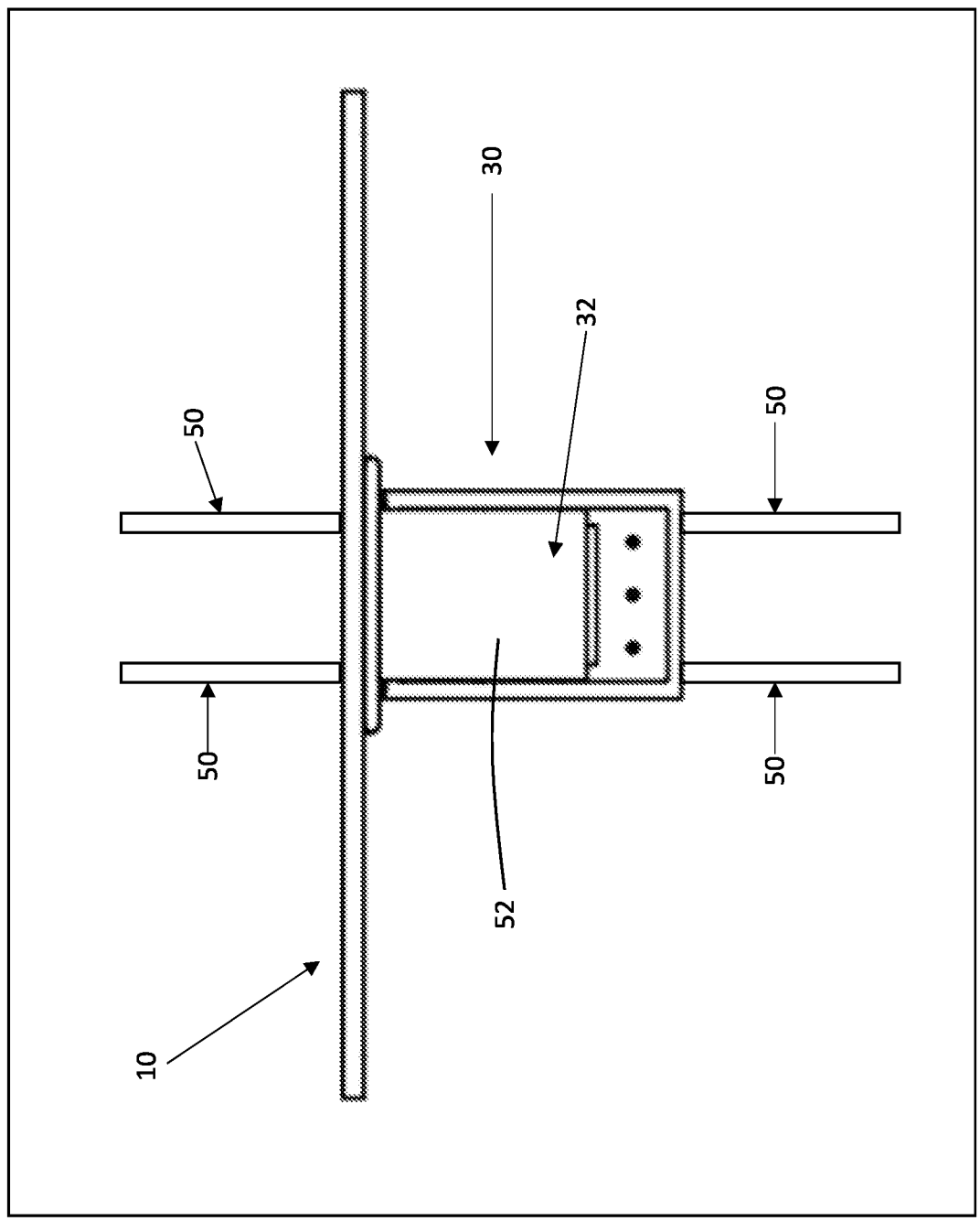
FIG. 12 is a front view of the work surface and the mounting portion of FIG. 9, shown in a coupled position, according to an alternate embodiment.

In the embodiment illustrated in FIG. 12, the mounting portion 30 is secured to the wall by one or more rails 50. In the illustrated embodiment, the rails 50 are vertically oriented, however, in other embodiments the rails maybe oriented horizontally, diagonally, or at another angle. In yet another embodiment, the mounting portion 30 is mounted to only a single rail, rather than two rails. The mounting portion 30 is movable along the rails 50 between one or more different positions or heights. The mounting portion 30 has a locking mechanism with the rails 50 in secure the mounting portion 30 at the desired position. The rails 50 allow the user to adjust the position of the work surface 10 by moving the mounting portion 30. This movement allows the user to use the work surface 10 as a standing desk or a sitting desk. This movement also allows the height or position of the work surface 10 to be customized for different users of different sizes and preferences.

Figure 13:
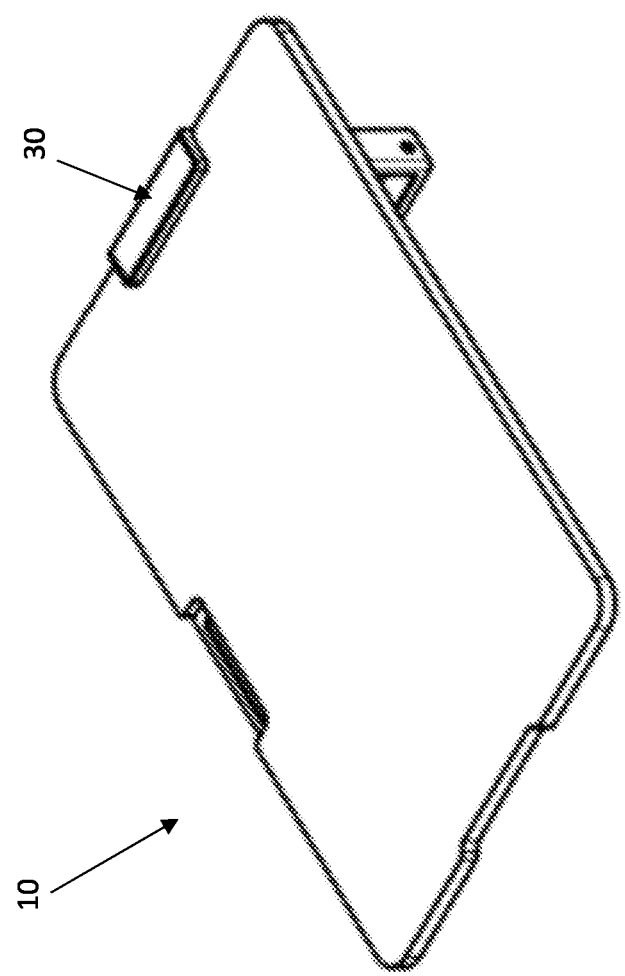
FIG. 13 is a perspective view of the work surface and the mounting portion of FIG. 9, shown in a coupled position, according to an alternate embodiment.
Figure 13A:
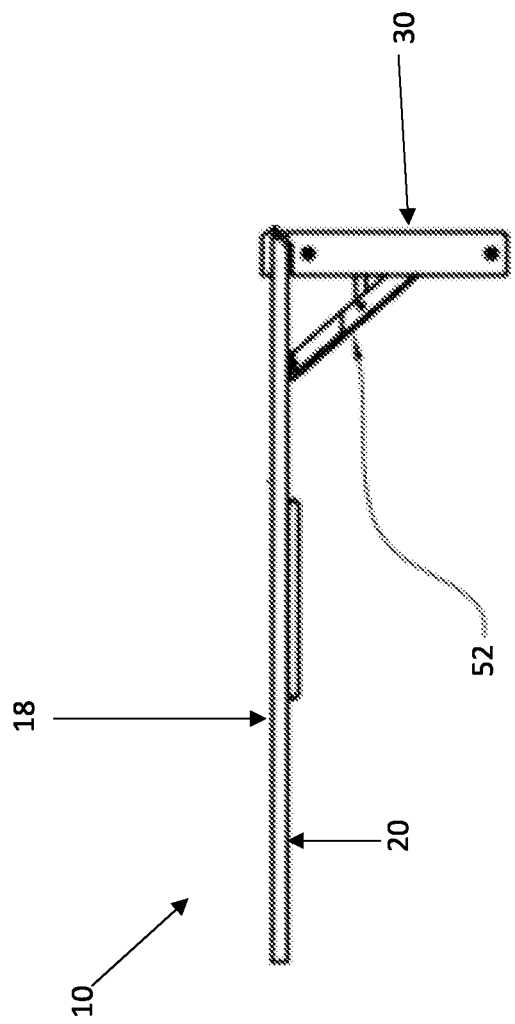
FIG. 13a is a side view of the work surface and the mounting portion of FIG. 9, shown in a coupled position, according to an alternate embodiment.
Figure 14:
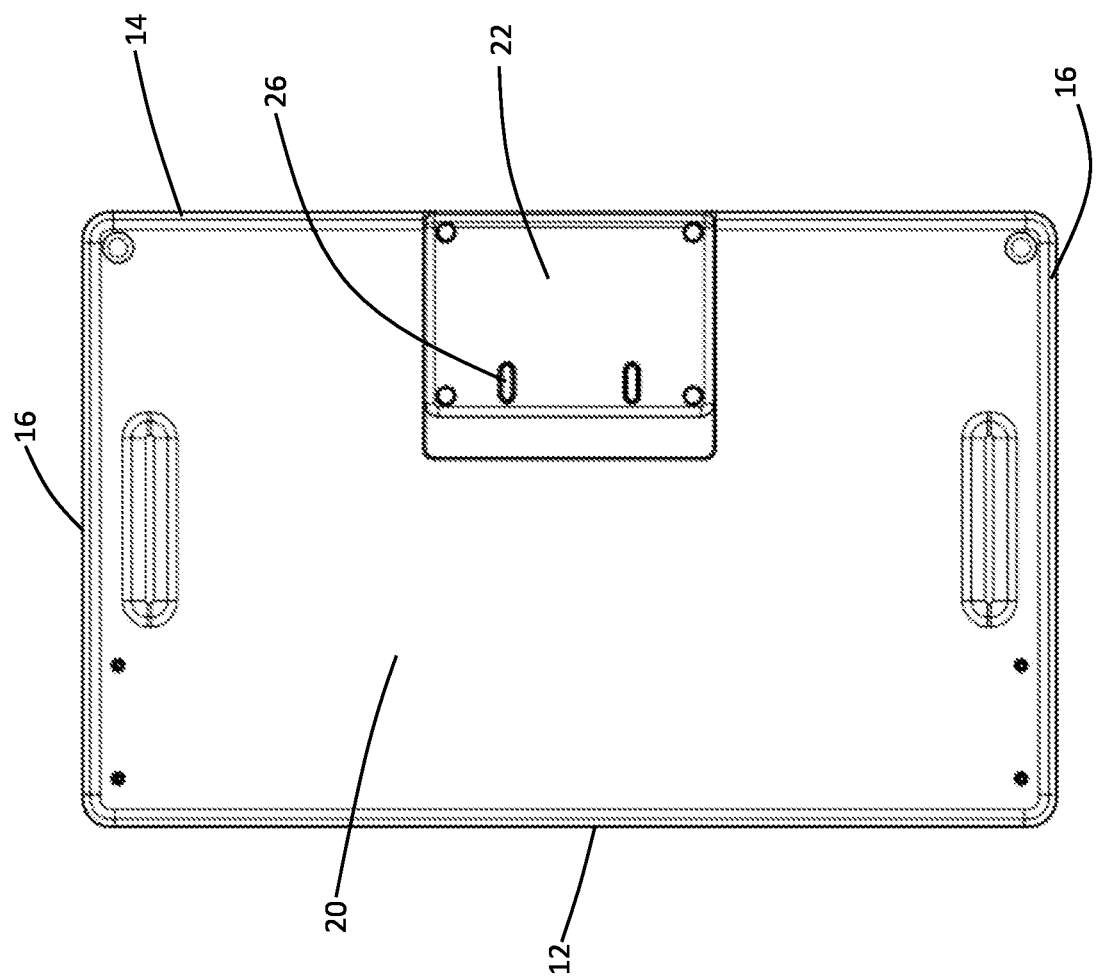
FIG. 14 is a bottom view of the work surface of FIG. 1, shown in a removed position.
Figure 15:
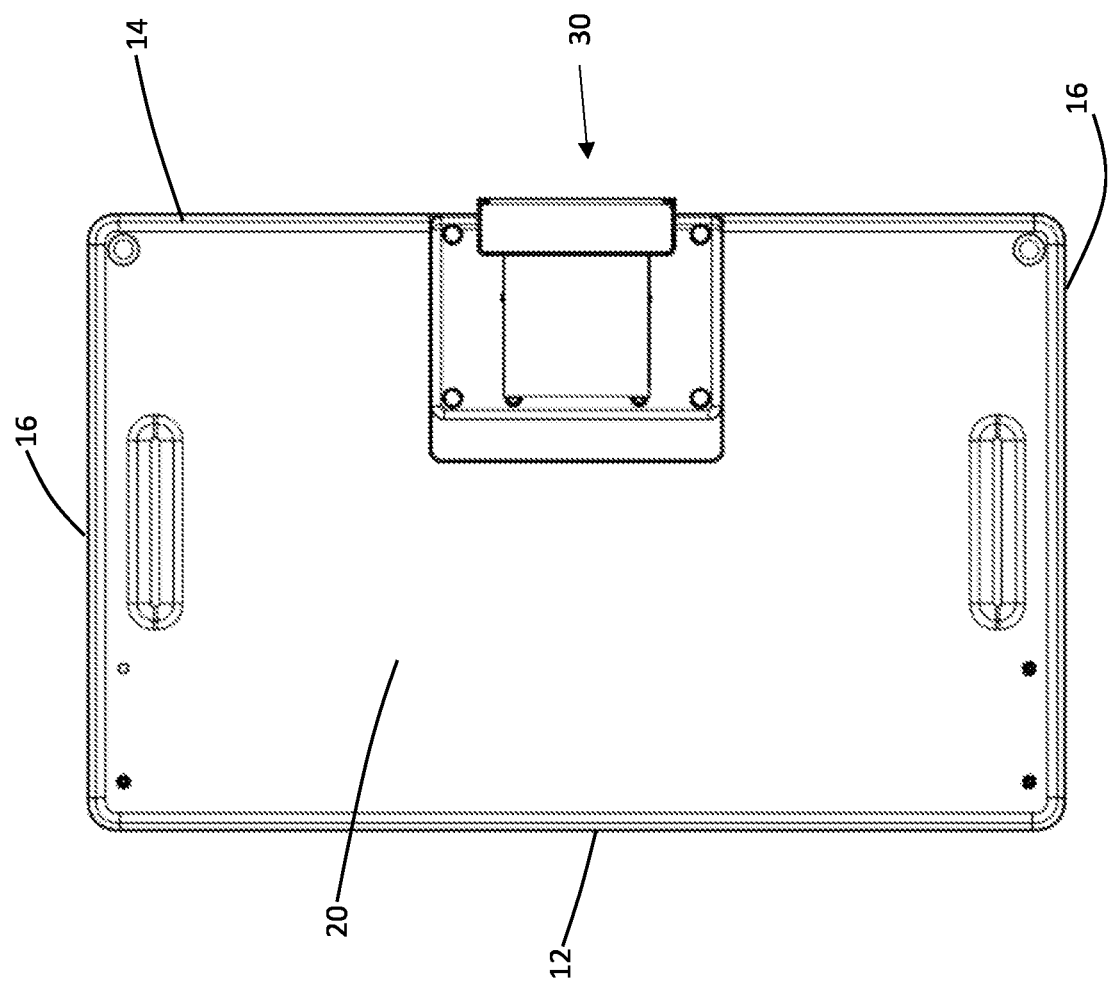
FIG. 15 is a bottom view of the work surface and the mounting portion of FIG. 9, shown in a coupled position.

In the embodiment illustrated in FIGS. 13 and 13a, the work surface 10 is coupled to the mounting portion 30 at either one of the lateral edges 16. This arrangement allows further customizability and flexibility to the user. The user may choose which work surface 10 orientation is more suited for their needs. As in the orientation where the work surface 10 is coupled along the rearward edge 14, the lateral edge 16 enters the aperture 44 and is secured by the aperture 44 as well as the arm 42.

In one embodiment, the bottom surface 20 includes an attachment mechanism to allow the user to add accessories to the bottom surface 20 to further customize and enhance to the work surface 10. In one embodiment, the accessory is a pad to turn the work surface 10 into a lap desk in the removed position. In other embodiments, the accessories may include a storage area, a keyboard holder, folding legs, a cord management system. In one embodiment, the attachment mechanism is a magnetic grid that cooperate with a magnetic grid on the accessory. In one embodiment, the attachment mechanism may one or more T-slots that correspond to track on the accessory to receive the accessory. The attachment mechanism may be screws, integral fasteners, threaded fasteners, snap-fit attachment, friction fit attachment, or the like. It is noted that these are not exhaustive lists of potential accessories or attachment mechanisms, but rather only a sample of potential options. This list is in no way meant to be limiting.

Various features and advantages of the invention are set forth in the following claims.

What is claimed is:

1. A work surface and mounting portion, comprising:
a work surface having a top surface, a bottom surface, a forward edge, a rearward edge, and two lateral edges extending between the forward edge and the rearward edge;
a mounting portion having a top side, a bottom side, a back side, and a front side, the back side being mounted to a wall, the front side including a door selectively movable between a first position and a second position;
wherein the first position the door is substantially planar between the top side and the bottom side;
wherein in the second position the door extends away from the top side, exposing an arm and an aperture;
the work surface is movable between a removed position where the mounting portion is in the first position and the work surface is spaced apart from the mounting portion and a coupled position where the mounting portion is in the second position and the work surface is coupled to the mounting portion;
wherein the coupled position a portion of the work surface is inserted into the aperture such that a mounting portion of the top surface and a mounting portion of the bottom surface are within the aperture and a support portion of the bottom surface is engaged by the arm outside of the aperture.

2. The work surface of claim 1, wherein the top side includes a depression positioned such that in the coupled position the top side of the work surface is substantially level with the top surface of the mounting portion.

3. The work surface of claim 1, wherein a length of the mounting portion along the rearward edge is between 15% and 75% or less a length of rearward edge as measured between the lateral edges.

4. The work surface of claim 1, wherein a length of the mounting portion along the rearward edge is between 15% and 30% or less a length of rearward edge as measured between the lateral edges.

5. The work surface of claim 3, wherein the mounting portion interacts with the work surface along one continuous length in the coupled position.

6. The work surface of claim 1, wherein the mounting portion further comprises one or more rails on the back surface.

7. The work surface of claim 6, wherein the mounting portion is movable along the rails to adjust the height of the work surface in the coupled position.

8. The work surface of claim 1, wherein the lateral side of the mounting portion includes a mounting depth measured from the front side to the back side in the first position that is between 3% and 40% of a length of the lateral edge of the work surface.

9. The work surface of claim 1, wherein the lateral side of the mounting portion includes a mounting depth measured from the front side to the back side in the first position that is between 3% and 15% of a length of the lateral edge of the work surface.

10. The work surface of claim 1, wherein the door translates and then pivots between the first position and the second position such that in the first position the door is substantially planar with the top side and the bottom side and in the second position the door pivots about a pivot point to move away from the top side.

11. A work surface and mounting portion comprising:
a mounting portion having a front side, a back side, a top side, a bottom side, and two lateral sides, the mounting portion further including a door on the front side, an arm, and an aperture that is selectively coverable by an aperture cover;
wherein the back side is mounted to a wall;
the mounting portion is movable between a first position in which the aperture cover is positioned to cover the aperture and the door level with the front side and a second position in which the aperture cover is moved to expose the aperture and the door on the front side moves to expose the arm;
a work surface having a front edge, a rearward edge, two lateral edges, a top surface, a bottom surface, a mounting area covering a portion of the top surface and the bottom surface, and a support area on the bottom surface;

the work surface is movable between a removed position in which the work surface is spaced apart from the mounting portion and a coupled position in which the work surface is coupled to the mounting portion.

12. The work surface of claim 11, wherein the mounting area includes a depression positioned such that in the coupled position the mounting area is substantially level with the top side of the mounting portion.

13. The work surface of claim 11, wherein a length of the mounting area along the rearward edge of the work surface is between 15% and 75% or less a length of the rearward edge.

14. The work surface of claim 13, wherein the mounting portion interacts with the work surface along one continuous length in the coupled position.

15. The work surface of claim 11, wherein the mounting portion further comprises one or more rails on the back side.

16. The work surface of claim 11, wherein the lateral side of the mounting portion includes a mounting depth measured from the front side to the back side in the first position that is between 3% and 40% of a length of the lateral edge of the work surface.

* * * * *